United States Patent [19]
Busby et al.

[11] Patent Number: 6,062,719
[45] Date of Patent: May 16, 2000

[54] HIGH EFFICIENCY EXTRUDER

[75] Inventors: Forest Busby, Midland, Mich.; Ray A. Herring, Angleton; Richard O. Kirk, Lake Jackson, both of Tex.; Kathryn S. Jones, Clarksville, N.Y.

[73] Assignee: The Dow Chemical Company, Midland, Mich.

[21] Appl. No.: 08/974,185

[22] Filed: Nov. 19, 1997

Related U.S. Application Data

[63] Continuation-in-part of application No. 08/935,626, Sep. 23, 1997
[60] Provisional application No. 60/026,615, Sep. 24, 1996.

[51] Int. Cl.$^7$ ................................................ B29B 7/42
[52] U.S. Cl. ............................................. 366/85; 366/89
[58] Field of Search ................................. 366/83, 84, 85, 366/86, 88, 89, 90; 425/208

[56] References Cited

U.S. PATENT DOCUMENTS

| | | | |
|---|---|---|---|
| 2,231,357 | 2/1941 | Burghauser et al. | 366/85 |
| 2,802,238 | 8/1957 | Colombo | 366/85 |
| 3,104,420 | 9/1963 | Selbach | 366/85 |
| 3,254,367 | 6/1966 | Erdmenger | 366/85 |
| 3,407,438 | 10/1968 | Selbach | 366/85 |
| 3,608,868 | 9/1971 | Koch | 366/82 |
| 3,667,733 | 6/1972 | Fritsch | 366/85 |
| 4,131,371 | 12/1978 | Tynan . | |
| 4,300,839 | 11/1981 | Sakagami | 366/85 |
| 4,423,960 | 1/1984 | Anders . | |
| 4,474,475 | 10/1984 | Moriyama | 366/85 |
| 4,900,156 | 2/1990 | Bauer . | |
| 4,925,313 | 5/1990 | Nunn | 366/90 |
| 5,219,590 | 6/1993 | Kruder et al. | 366/89 |
| 5,375,992 | 12/1994 | Kruder et al. | 366/89 |
| 5,527,106 | 6/1996 | Zimmerman | 366/85 |
| 5,599,098 | 2/1997 | Christie | 366/90 |

FOREIGN PATENT DOCUMENTS

| | | | |
|---|---|---|---|
| 0049835 | 4/1982 | European Pat. Off. . | |
| 0 788 868 A1 | 8/1997 | European Pat. Off. . | |
| 1 529 828 | 1/1970 | Germany . | |
| 55-137941 | 10/1980 | Japan | 366/85 |
| 5-269734 | 10/1993 | Japan | 366/89 |
| 6-47734 | 2/1994 | Japan | 366/85 |
| 1634511 | 3/1991 | U.S.S.R. | 366/85 |
| 98 13189 A1 | 4/1998 | WIPO . | |

OTHER PUBLICATIONS

JP 56–056841 (Abstract Only).
JP 55–137941 (Abstract Only).
JP 61–171319 (Abstract Only).
R. Friedrich, "Powder Compression with Co–Rotating Twin–Screw Extruders", *Journal of Powder & Bulk Solids Technology*, No. 4, 1980, pp. 27–32.

(List continued on next page.)

*Primary Examiner*—Tony G. Soohoo

[57] ABSTRACT

A corotating multiple-screw extruder comprising first and second intermeshing screws of more than one flight. The first screw comprises first and second segments paired with first and second segments of the second screw, respectively. On the first segment of the first screw, the height of the first flight is less than the height of the second flight and on the second segment of the second screw, the height of the first flight is less than the height of the second flight and screws for use in such extruder.

25 Claims, 12 Drawing Sheets

OTHER PUBLICATIONS

F. G. Martelli et al., "Twin–Screw Extrudes: A Basic Understanding", pp. 21–23, 31–32, 34–35, 42, 69–72, 93, 1983.

C. Rauwendaal, "How to Select the Right Twin–Screw Extruder", *Plastics World,* pp. 58–60, 62–63, Dec. 1993.

L. N. Valsamis and E. L. Canedo, "Compounding of Glass Reinforced Plastics in Corotating Intermeshing Twin–Screw Extruder with Novel Mixing Sections", *Society of Plastics Engineers Conference Proceedings/Antec 96',* May 5–10, pp. 376–380.

R. J. Nichols and F. Kher–adi, "Melting in CRT twin–screw extruders", *Modern Plastics,* vol. 61, No. 2, pp. 70,72,74, Feb. 1984.

M. L. Booy, "Isothermal Flow of Viscous Liquids in Corotating Twin Screw Devices", *Polymer Engineering and Science,* vol. 20, No. 18, pp. 1220–1228, Dec. 1980.

*Plastics Formulating & Compounding,* Oct./Nov. 1995.

C. Rauwendal, "Twin–Screw Extruders", *Polymer Extrusion,* pp. 459–464, 466, 470, 475–477, 485–486.

U.S. application No. 08/935,626, filed Sep. 23, 1997.

HIGH EFFICIENCY EXTRUDER

CROSS REFERENCE TO RELATED APPLICATIONS

This application is a continuation-in-part of U.S. Ser. No. 08/935,626, which was filed on Sep. 23, 1997 and is incorporated herein in its entirety which claims the benefit of U.S. Provisional Application Ser. No. 60/026,615 which was filed Sep. 24, 1996.

FIELD OF THE INVENTION

This invention relates to a multiple-screw extruder, and to a screw, including segments thereof, for use therein.

BACKGROUND OF THE INVENTION

A multiple-screw extruder is a commonly used instrument for the plastication, mixing and/or pumping of extrudable material, such as polymeric material or other kinds of viscous material such as dough. Polymeric materials are useful for the fabrication of a variety of molded or shaped articles. Plastication refers to the softening of polymeric material to such an extent that it flows freely and will assume any shape. In the case of polymeric material which is crystalline, plastication is synonymous with melting. In the case of polymeric material which is amorphous, plastication occurs at or about the glass transition temperature ("$T_g$") thereof. (Reference below to "polymeric material" may be read also as a reference in the appropriate sense to other kinds of extrudable material.)

A multiple-screw extruder contains two or more screws, each of which is similar in various basic respects to that which is used in a single-screw extruder. Such a screw is shaped generally in the form of an elongated cylinder, and has one or more raised ridges helically disposed thereabout, each of which is a "flight". A flight may have forward or reverse pitch, and the degree of pitch may be varied. The surface of the screw above which the flight(s) are raised is the root of the screw. When the screw is viewed in cross section (i.e. in a plane perpendicular to its central, longitudinal axis), the course of a particular flight, between one point of intersection with a line parallel to the screw axis and the next closest point of intersection of the flight with such line, typically defines a 360° circle. The pointed or rounded tip of a flight which extends toward the perimeter of such circular-shaped cross section defines a "lobe" above the root of the screw. In the cross-sectional view of FIG. 1, the lobes 10 of a 2-flighted screw are shown. The distance in the longitudinal (axial) direction along the screw, between one point on a line intersecting a particular flight and the next closest point of intersection of such line with the same flight, is one turn of the screw. The space bounded by the root of the screw and the side walls of any two flights is a channel of the screw. The side wall of a flight may, if desired, be undercut such that the channel does not, as so modified, conform to the Erdmenger profile. The screw rotates on its longitudinal axis within a barrel or sleeve, which may be generally described as the bore of an annular cylinder.

The plasticating screw typically has an initial, feed section which begins the process of conveying solid polymeric material forward within the barrel of the extruder. Polymeric material may be flood fed into the extruder by means of a hopper which empties into the barrel, or may be metered into the barrel through a feed chute or a side feeder. The direction of travel of the polymeric material in the barrel as it is transported away from the feed port by the screw is considered the "downstream" direction. The feed section of the screw is typically followed, with or without other intervening sections, by a melting section in which partial or complete plastication of the polymeric material occurs. Plastication of the polymeric material occurs as a result of the combined effect of conductive heat produced, for example, by heater bands mounted on the outside of the extruder barrel and the physical deformation (or viscous heating) to which screw action subjects the polymeric material. The melting section of the screw is typically followed, again with or without other intervening sections, by a metering section which functions to pump the plasticated material, as extrudate, out through the downstream end of the extruder, which typically contains a die or some other form of restricted orifice. The sections of the extruder and screw through which the polymeric material travels before it reaches the die are considered to be "upstream" from the die.

Aspects of a multiple-screw extruder which have no direct analogy in a single-screw extruder pertain to the location, relative to each other, of the several screws within the barrel. Two screws in a multiple-screw extruder are said to be intermeshing if a flight of one screw is disposed within a channel of the other screw. In such configuration, the distance between the axis of each screw is less than the sum of the respective radii of the two screws, when each radius is measured from the axis to the top of the tallest or highest flight of the screw. A pair of conventional intermeshing screws is shown in FIG. 2. When, on a pair of screws, a flight has a shape and size such that its fit into a channel in which it is intermeshed is close enough that essentially no extrudable material passes through the space between the flight and channel, the screws are said to be conjugated. Otherwise, the screws are said to be non-conjugated, and the degree of intermeshing in the case of non-conjugation can be varied to an essentially unlimited extent. If the screws rotate in the same direction, i.e. both clockwise or both counterclockwise, they are said to be corotating. If not, they are said to be counterrotating.

When two counter-rotating screws are conjugated, there is little or no opportunity for polymeric material which is being extruded to remain in a channel of either screw in the region in which the screws intermesh. This is a result of the minimal clearance of the flight of one intermeshing screw within the channel of the other screw. Screws which are arrayed in such manner are said to "wipe" each other because polymeric material which is carried in the channel of either screw will be prevented from remaining in that channel over a distance of more than one turn of the screw by the obstacle which the intermeshing flight of the other screw represents. In this configuration, most, if not essentially all, of the polymeric material resides in the portion of the channel on the top, bottom and outside (non-intermeshed side) of each screw, and the material consequently experiences significantly more movement in the downstream direction, parallel to the screw axis, than it does in a lateral direction, perpendicular to the axis. This arrangement results in efficient pumping of the polymeric material in the downstream direction, but does not achieve optimum intermixing of the whole body of polymeric material present in the extruder. Conversely, counter-rotating screws which are non-conjugated are characterized by greater clearance between an intermeshed flight and the corresponding channel. This allows greater space for polymeric material to reside in the channels of both screws in the region of intermeshing. Intermixing of the polymeric materials is enhanced by this concentration of the action of both flights in such a confined space, however some efficiency of pumping is lost.

Corotating screws, even when conjugated, allow for extensive movement of polymeric material laterally from one screw to the other. Mixing is benefited by this movement around the "equivalent screw", and it is further enhanced when the screws are not conjugated. The shape of the flights on non-conjugated screws may be arranged to create the passage of polymeric material from one channel into two channels on another screw. Or, when screws are conjugated, or essentially conjugated, certain flights can be designed in a shape such that they wipe each other in the zone of intermeshing but do not wipe the wall of the barrel. For example, a multiple-screw, barrier-type extruder is disclosed in U.S. Pat. No. 4,300,839 in which one or more flights on each screw is reduced in height by an amount which is constant along the entire length of the screw, and which is sufficient to allow the passage of polymeric material between the two channels on either side of any such flight. This clearance between the wall and the top of the flight does not exist, however, for those flights in the zone of intermeshing. Designs such as these appear to provide thorough mixing, but considerations of pumping efficiency and residence time sometimes limit their usefulness.

Nichols et al disclose in Modem Plastics, Volume 61 at Page 70 (February, 1984), that dissipative mixing can be attained in a counter-rotating tangential twin-screw extruder by staggering the screw flights. Unfortunately, this technique appears to have no application beyond the field of tangential (i.e. non-intermeshing) extruders because the flights of conventional intermeshing screws may be considered, in this context, to be "staggered", at least to some extent, in the sense that they could not intermesh if a flight on one screw was not paired with a channel on the other screw rather than another flight.

It would therefore be beneficial to have a design for two intermeshing screws to be paired in a multiple-screw extruder to simultaneously obtain both a desirably high degree of intermixing, and a high rate of pumping, of extrudable material. It is consequently an object of this invention to provide a multiple-screw extruder in which even conjugated screws will furnish a desirably high level of compositional homogeneity and process stability.

SUMMARY OF THE INVENTION

In one aspect, this invention involves a multiple-screw extruder which has
  (a) a first screw about the root of at least one segment of which are disposed flight(s), the number of which flight(s) is x; and
  (b) a second screw about the root of at least one segment of which are disposed flight(s), the number of which flight(s) is x';
wherein the flight(s) on each x-flighted segment of the first screw are intermeshed with the flight(s) on a x'-flighted segment of the second screw, and x is not equal to x'.

In a further aspect, this invention involves a multiple-screw extruder which has
  (a) a first screw having a flighted segment about the root of which a flight does not terminate or begin or is not discontinuous; and
  (b) a second screw having (i) a partially flighted segment about the root of which are disposed one or more flight(s) which begin, terminate or are discontinuous, or (ii) a non-flighted segment about the root of which are disposed no flights;
wherein each flighted segment of the first screw is paired with a partially flighted or a non-flighted segment of the second screw.

In yet another aspect, this invention involves a multiple-screw extruder comprising
  (a) a first screw (i) about the root of at least one segment of which are disposed flight(s), the number of which flight(s) is x; and (ii) about the root of at least one other segment of which are disposed flight(s), the number of which flight(s) is z; and
  (b) a second screw having at least two segments both of which are either (i) a partially flighted segment about the root of which are disposed one or more flight(s) which begin, terminate or are discontinuous, or (ii) a non-flighted segment about the root of which are disposed no flights;
wherein each x-flighted segment and each z-flighted segment of the first screw is paired with either a partially-flighted or a non-flighted segment of the second screw; and x is not equal to z.

In yet another aspect, this invention involves an extruder screw comprising a root about one or more segments of which are disposed x flight(s), and about one or more segments of which are disposed z flight(s), wherein x is 1, 2 or 3 and z is 1, 2, 3, 4 or 5, but not equal to x.

In yet another aspect, this invention involves the use of the above described screw or any of the above described extruders in a method of reducing vent flow in an extruder.

In yet another embodiment, this invention involves a multiple-screw extruder which has first and second screws which are intermeshed, wherein
  (a) the first screw has first 30 and second 31 flights; and
  (b) within at least one segment of the first screw which has a longitudinal distance of at least one-half of a turn, the top of the first flight lies a shorter radial distance away from the center axis of the first screw than does the top of the second flight.

In yet another embodiment, this invention involves a multiple-screw extruder which has first and second screws which are intermeshed, wherein
  (a) the first screw has first 30 and second 31 flights;
  (b) within at least one segment of the first screw, the top of the first flight lies a shorter radial distance away from the center axis of the first screw than does the top of the second flight;
  (c) the second screw has first 32 and second 33 flights; and
  (d) within at least one segment of the second screw which has a longitudinal distance of at least one-half of a turn, the top of the first flight lies the same radial distance away from the center axis of the second screw as does the top of the second flight.

In yet another aspect, this invention involves a method of extrusion in which the above described screw or any of the above described extruders is used to extrude an extrudable material, such as polycarbonate.

DETAILED DESCRIPTION OF THE INVENTION

Figure 3:
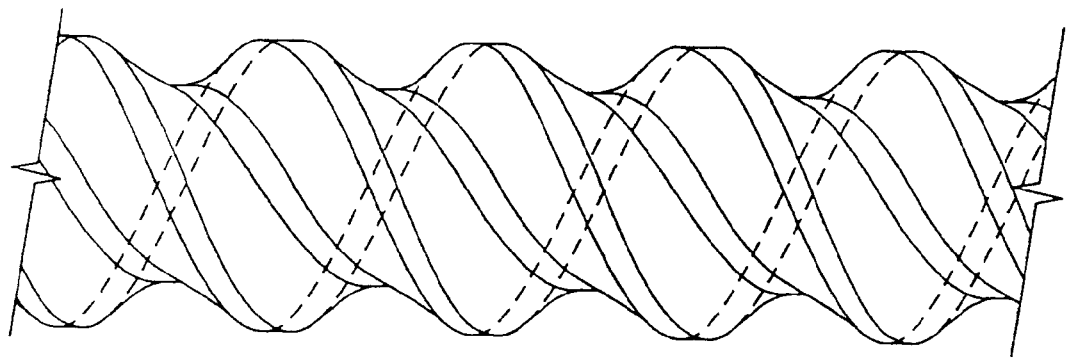
FIG. 3 shows a side, plan view of a portion of a dual-flighted (i.e. 2-flighted) screw.
Figure 4:
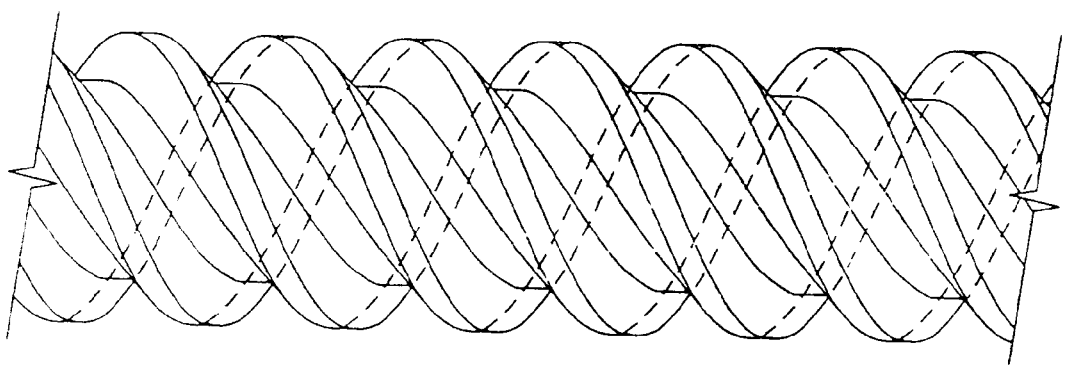
FIG. 4 shows a side, plan view of a portion of a 3-flighted screw.

In the multiple-screw extruder of this invention, at least one screw is employed which has, either throughout its entire length, or along some shorter portion thereof, more than one flight, for example 2 or 3 flights. A portion of a dual-flighted screw is shown in FIG. 3, and a portion of a 3-flighted screw is shown in FIG. 4. Screws with more than 3 flights are not typical, but are known and may be used in the multiple-screw extruder of this invention.

Figure 5:
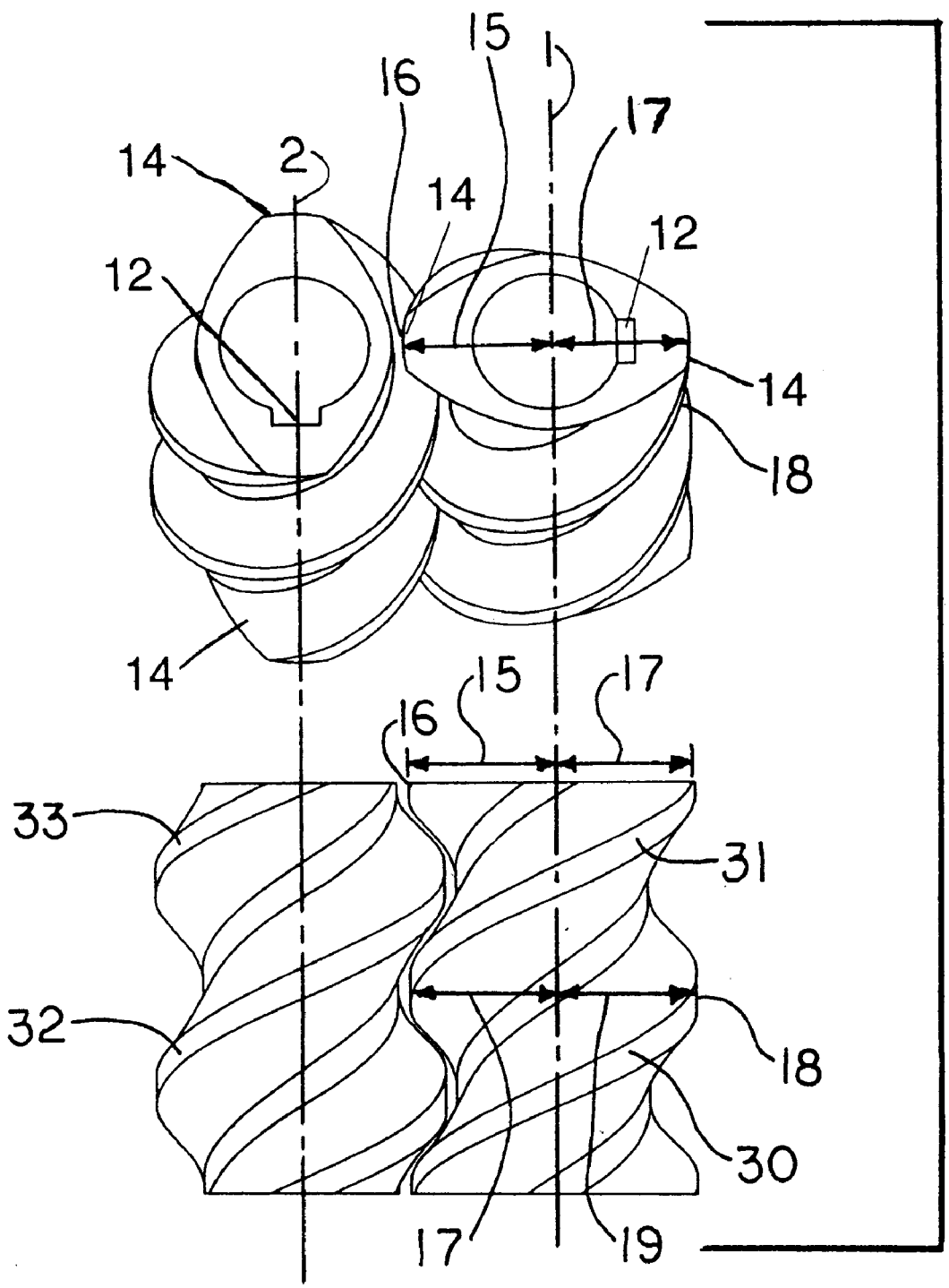
FIG. 5 shows side and end views of 2-flighted screw elements.

In one embodiment, a screw for use in this invention may be formed from a single, continuous piece of metal. A screw which is a single, continuous piece of metal is characterized by the fact that it cannot be transformed into a group of shorter sections except by means, such as cutting with a saw or torch, which would produce the shorter sections in a condition not allowing for their reassembley into exactly the same original screw. In an alternative embodiment, a screw for use in the multiple-screw extruder of this invention may be assembled from several separately manufactured screw elements, each of which forms just a portion of the screw as actually operated. These screw elements are disposed in head-to-toe fashion in the appropriate sequence on an axial shaft to form a "stack", and are held in place as the shaft rotates by a system of splines and keyways and a locking nut at the end of the shaft. In FIG. 5, screw elements are shown having a keyway 12, in which a spline on a screw shaft would be inserted, and lobes 14.

A screw for use in the multiple-screw extruder of this invention may be characterized by a particular design along its entire length or along only a segment thereof. When various segments of a screw do not contain the same design, the differences in design may relate to number of flights, presence of a flight discontinuity, absence of flights, or variation in flight height. Although a screw that is a single, continuous piece of metal may be regarded as being constituted of various segments which may be visibly identified, such segments will not, as noted above, be separable physically. Within a screw that is a single, continuous piece of metal, the length of a segment may be selected with a reasonable degree of latitude depending on the type of material to be extruded. The length of such a segment may, for example, be less than about 0.25 turn, but is more likely at least about 0.25 turn, or is alternatively at least about 0.5 turn, or is alternatively at least about 1 turn, or is alternatively at least about 2 turns; and yet may be about 20 or fewer turns, or is alternatively about 10 or fewer turns, or is alternatively about 6 or fewer turns, or is alternatively about 4 or fewer turns. Expressed in terms of the gross dimension of a screw, a segment of a screw that is a single, continuous piece of metal is typically at least about one one-hundredth of the entire length of the screw, but may be any distance in the range of less than about 0.01 to about 0.3 of the length, and it is preferably about 0.01 to about 0.1, is more preferably about 0.01 to about 0.05, and is most preferably about 0.01 to about 0.025 of the entire length of a screw.

Similarly, when a screw is assembled as a stack of elements, the length of a segment of such screw may be described by number of turns or as a portion of its measured length, or may be described with reference to the screw elements themselves. A screw assembled as a stack of elements may be constituted of a portion of one, one, or more than one such elements. A segment on a screw stack may, for example, be less than about 0.25 element, but is more likely at least about 0.25 element, or is alternatively at least about 0.5 element, or is alternatively at least about 1 element, or is alternatively at least about 2 elements; and yet may be about 10 or fewer elements, or is alternatively about 6 or fewer elements, or is alternatively about 4 or fewer elements.

Within one or more such segment(s) of a screw, whether the screw is a solid, continuous piece of metal or is assembled as a stack of screw element(s), (a) the number of flights may change one or more times;

(b) one or more flights may terminate, begin, or become discontinuous [(by terminating and then later resuming), i.e. the segment is partially flighted];

(c) there may be no flights at all (i.e. the segment is non-flighted); or (d) the flights may have different heights.

Instead of flights, a segment may contain non-continuous mixing elements such as kneading blocks or gear mixers. The various kinds of segments which are available for incorporation into a screw—i.e. those containing flights which have the same or differing height, those which are partially or non-flighted, and those containing non-continuous mixing elements, may be upstream or downstream from each other in any desired order.

In a multiple-screw extruder, the intermeshing of screws is described with respect to a pair of (two) screws. Segments of intermeshing screws which occupy the same longitudinal position relative to the full length of the axis of the barrel of the extruder are said to be paired. In the past, the practice has been to arrange intermeshing screws, or paired segments of such screws, such that the number of flights on each screw which intermesh (that is, the number of lobes) is equal. In the multiple-screw extruder of this invention, one or more screws is designed such that the number of flight(s) on the entire length of a first screw, or on a segment thereof, which intermesh with flight(s) on a second screw, or on a segment thereof, is not equal to the number of flight(s) on the entire length of the second screw, or on the intermeshing segment thereof. The two paired screws (or segments) may be said in this situation to have a mixed lobe count. Alternatively, a flighted segment of a first screw may be paired with a partially flighted or a non-flighted segment of a second screw. For example, the number of flights on the fist screw (or on one or more segment thereof) may be 1, 2, 3, 4 or 5, and the number of flights on the second screw (or on one or more segment thereof) may be a different number selected from 0, 1, 2, 3, 4, 5 or 6. The number of flights on the second screw, or on one or more segment thereof, may be greater or less than the number of flights of the first screw, or on one or more segment thereof, by 1, 2, 3, 4 or 5. Pairings of numbers of flights on intermeshing screws such as 1 and 2, 1 and 3, and 2 and 3 are preferred.

When a flighted segment of one screw is paired with a partially flighted or a non-flighted segment of another screw, the distance over which such pairing occurs may, for example, be less than about 0.25 turn, but is more likely at least about 0.25 turn, or is alternatively at least about 0.5 turn, or is alternatively at least about 1 turn, or is alternatively at least about 2 turns; and yet may be about 20 turns or fewer, or is alternatively about 10 or fewer turns, or is alternatively about 6 or fewer turns, or is alternatively about 4 or fewer turns.

A particular screw (a "first screw") may contain more than one segment which intermeshes with a paired segment on a second screw where the paired segment on the second screw has an unequal number of flights (or lobes) or is partially or non-flighted. This plurality of segments on the first screw may themselves contain different numbers of flights, and they may be arranged in any order. The various segments on either screw may be adjacent to each other, or may be separated from one another by intervening segments. The term "adjacent" as used here means immediately next to along the longitudinal axis of a screw.

When the number of flights on a particular segment or screw is being contrasted with the number of flights on a paired segment or screw, or on an adjacent segment, the notation "x", or "z" may be used to refer to the number of flights on the segment(s) or screw(s) in question, but the actual value of such number of flights may be unspecified other than to state that it lies within a certain range or may be determined by a mathematical calculation. A reference to a screw or segment as being "x-, or z-flighted" indicates that the screw or segment contains x, or z flights. For example, on a first screw, a segment which has x flights may be adjacent to, or may be axially (longitudinally) separated from, a segment on the same screw which has z flights, where x and z may each be 1, 2, 3, 4 or 5, but x is not equal to z. An x-flighted segment might have a z-flighted segment adjacent at each of its ends; or, a plurality of x-flighted segments and a plurality of z-flighted segments may alternate in succession such that no x-flighted segment is adjacent to another x-flighted segment and no z-flighted segment is adjacent to another z-flighted segment.

Both an x-flighted segment and a z-flighted segment on a first screw may be intermeshed with an x'-flighted segment and a z'-flighted segment on a second screw, respectively, where x does not equal z, and x' and z' are independently 0, 1, 2, 3, 4, 5 or 6. Z' may or may not equal z and x' does not equal x. When z' does equal z, only the x-flighted segment(s) exhibit a mixed lobe count with reference to the x' flighted segment(s). The value of x' for the segment which is intermeshed with the x-flighted segment may or may not be equal to the value of z' for the segment intermeshed with the z-flighted segment. For example, a 2-flighted segment (where x is 2) on a first screw may have a 1-flighted segment (where z is 1) adjacent at each of its ends. On a second screw, a 2-flighted segment (where z' is 2) may be intermeshed with each of the 1-flighted segments ("z" segments) on the first screw, and a 1-flighted segment (where x' is 1) on the second screw may be intermeshed with the 2-flighted segment ("x" segment) on the first screw. In this instance, unequal numbers of flights are intermeshed (there is a mixed lobe count) at each pairing of segments, and x' is not equal to x, z'is not equal to z, and x' does not equal z'. Pairings of numbers of flights such as x and/or z=1 and x'=z'=2; x and/or z=1 and x'=z'=3; and x and/or z=2 and x'=z'=3 are preferred.

Figure 6:
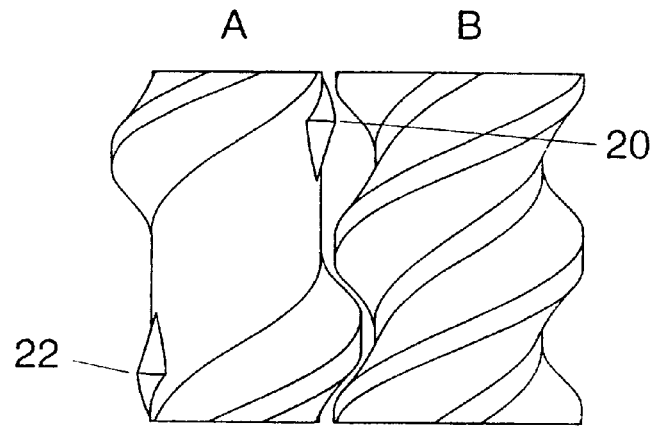
FIGS. 6–16 contain a sequence of views of intermeshing segments of two corotating screws as they rotate through a complete turn.
Figure 7:
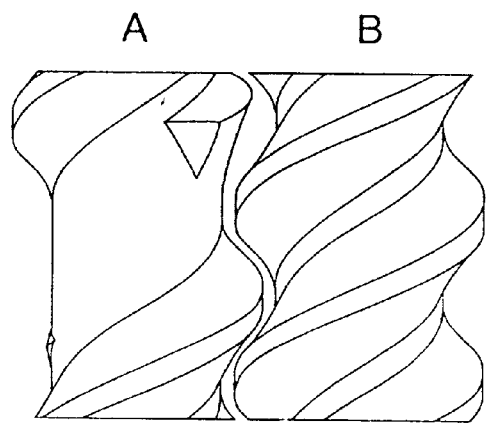
Figure 8:
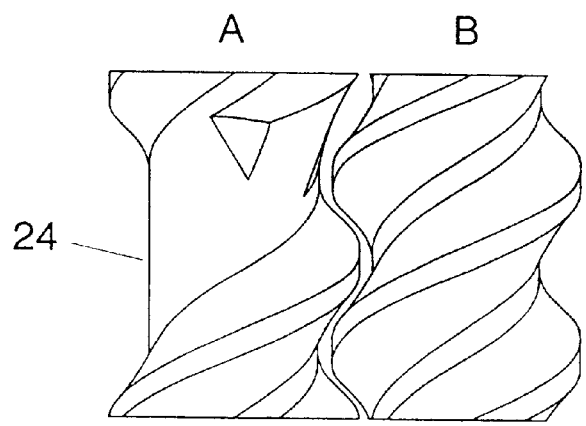
Figure 9:
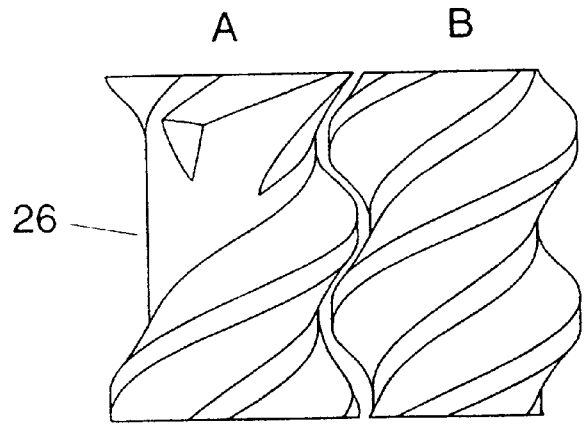
Figure 10:
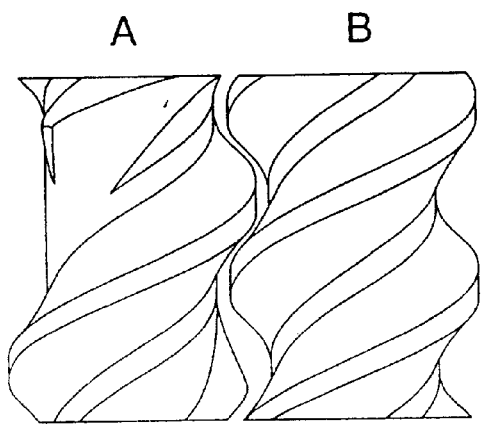
Figure 11:
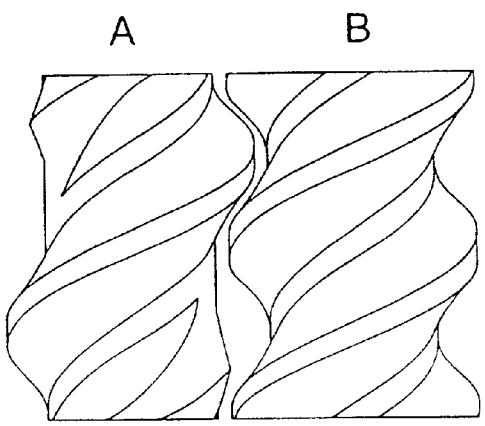
Figure 12:
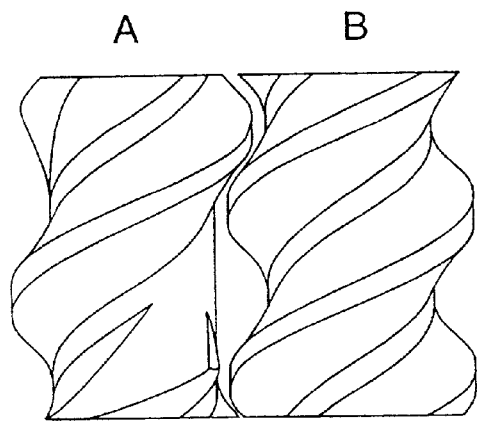
Figure 13:
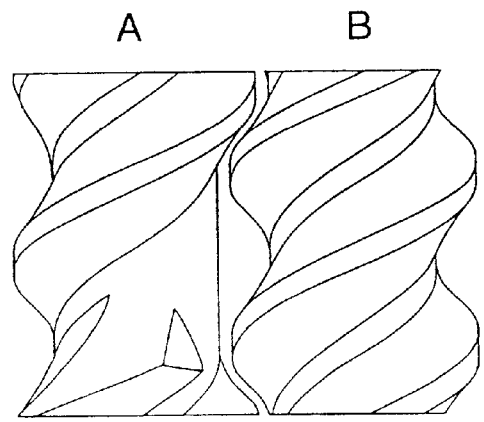
Figure 14:
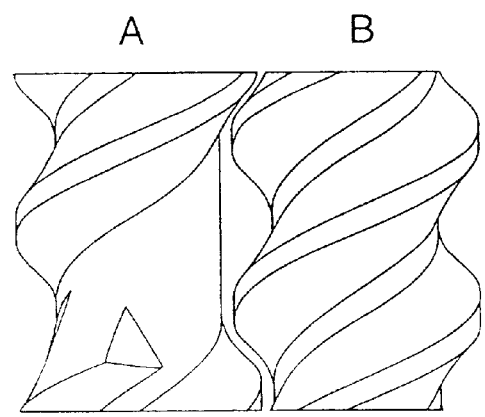
Figure 15:
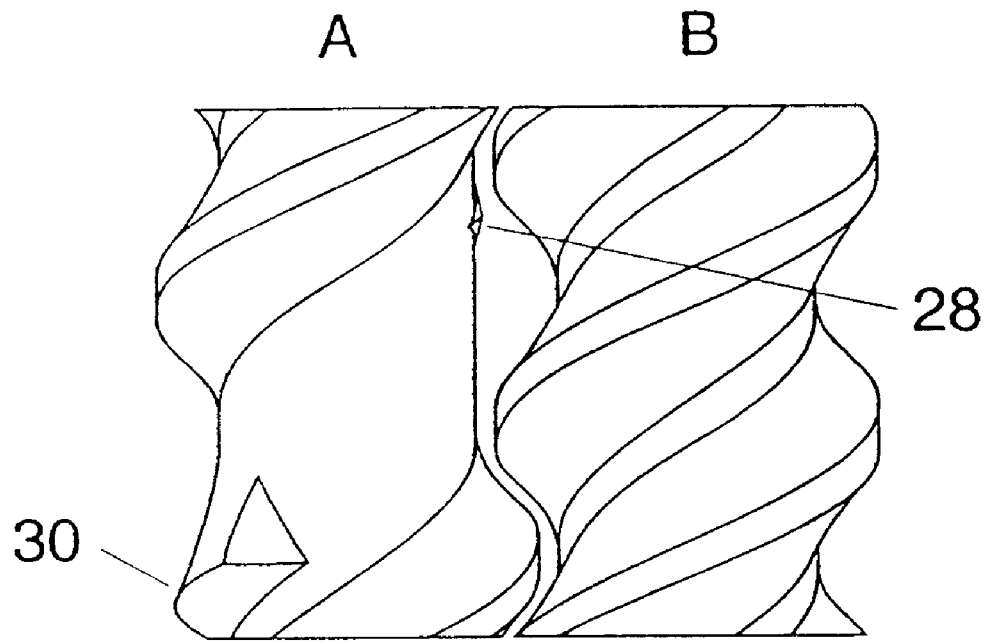
Figure 16:
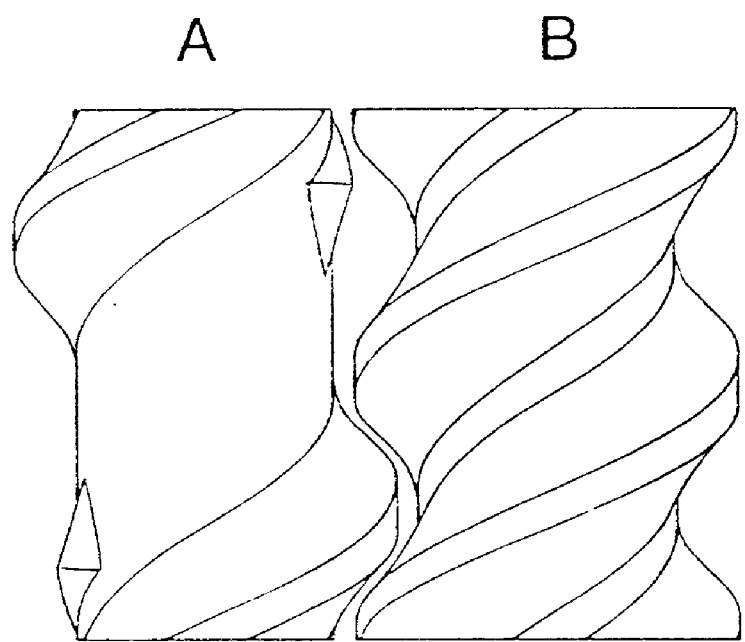

To illustrate one possible embodiment of the invention, FIGS. 6–16 contain a sequence of views of intermeshing segments of two corotating screws as they turn from right to left. The view in each figure represents, in succession, one tenth of a turn of each screw. The screw on the right ("Screw B") has 2 continuous flights. The screw on the left ("Screw A") has one continuous flight and a second flight which is discontinuous. In FIG. 6, the gap or void between the screws results from the fact that the discontinued portion of the discontinuous flight on Screw A is in the process of completing its rotation through the zone of intermeshing with Screw B. The discontinuous flight terminates at about 20 and resumes at about 22, in terms of a top-to-bottom direction of travel of the flight. The gap narrows in FIG. 7, and the screws are essentially conjugated in FIGS. 8–10, as Screw A rotates into a position in which the flight which is not discontinuous rotates through the zone of intermeshing. The absence of a flight in the discontinued portion of the discontinuous flight on Screw A may be seen at about 24 in FIG. 8 and at about 26 in FIG. 9. The gap between the screws begins to reappear in FIG. 11 as the discontinued portion of the discontinuous flight on Screw A begins to rotate back into the zone of intermeshing. This process continues until the gap between the screws reaches its greatest size when the discontinued portion of the discontinuous flight on Screw A is directly in or very close to the zone of intermeshing, as seen in FIGS. 13 and 14. The gap begins to decrease in size again in FIG. 15 as the point at which the discontinuous flight terminates 28 begins to rotate back into the zone of intermeshing, and the point at which the discontinuous flight resumes 30 rotates further away from Screw B. FIG. 16 shows the screws after a full 360° rotation to the same position as shown in FIG. 6.

The discontinued portion of the discontinuous flight on Screw A is shown in FIGS. 6–16 over a distance of one turn for the purpose of illustration. However, a 2-flighted segment of Screw B could be paired with a segment of Screw A which possesses a flight discontinuity over any desired distance on the screw, thus providing a regularly repeating sequence of the gap or void which grows and diminishes as the discontinued portion of the discontinuous flight on Screw A rotates through the zone of intermeshing with Screw B. Moreover, unequal lobe counts other than 1 and 2 may be selected, as described above; or a discontinuity may exist for a distance which is, for example, less than about 0.25 turn, but is more likely at least about 0.25 turn, or is alternatively at least about 0.5 turn, or is alternatively at least about 1 turn, or is alternatively at least about 2 turns; and yet may be about 20 or fewer turns, or is alternatively about 10 or fewer turns, or is alternatively about 6 or fewer turns, or is alternatively about 4 or fewer turns, with reference to a continuous flight on the same or a paired screw.

Figure 17:
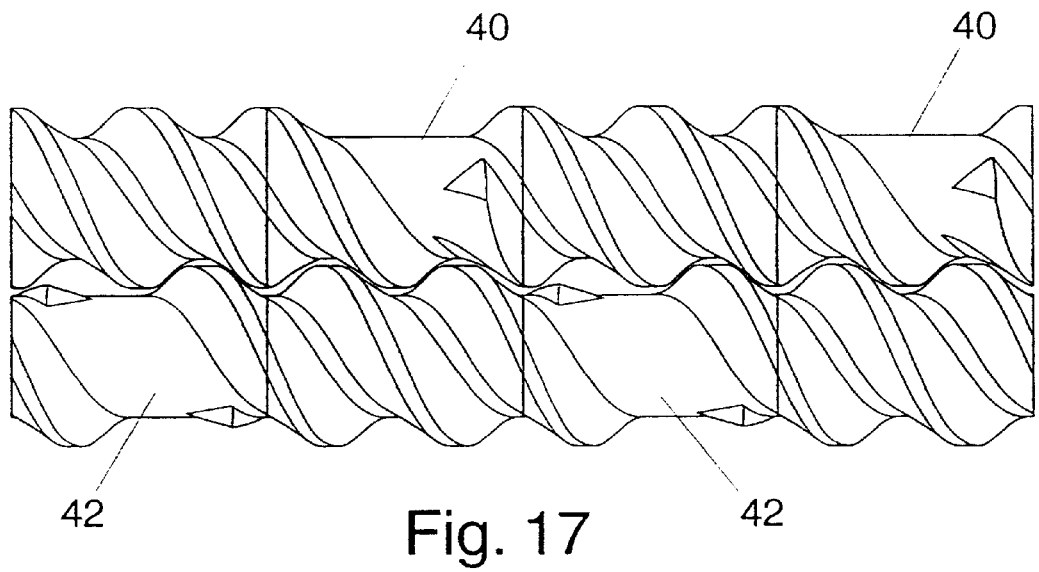
FIGS. 17–20 contain a sequence of views of intermeshing segments of two corotating screws as they rotate through a partial turn.
Figure 18:
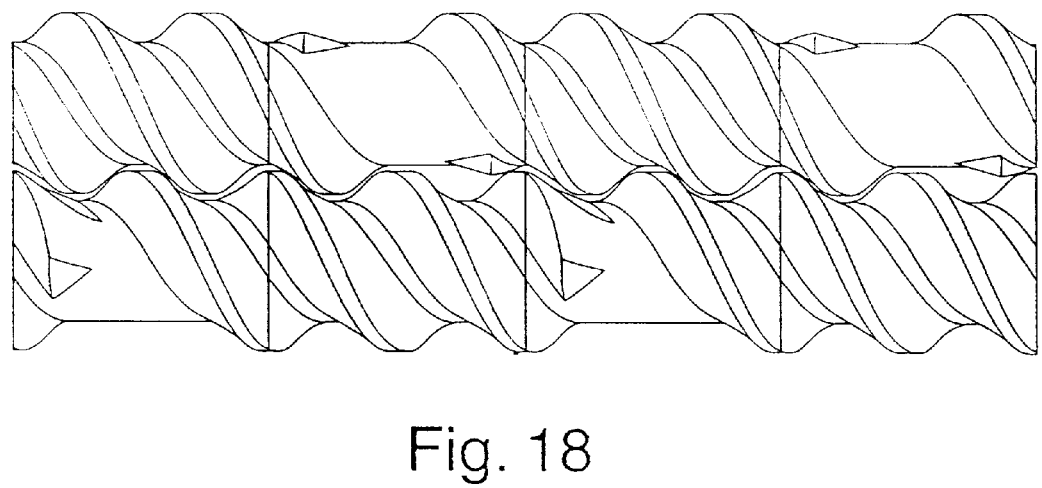
Figure 19:
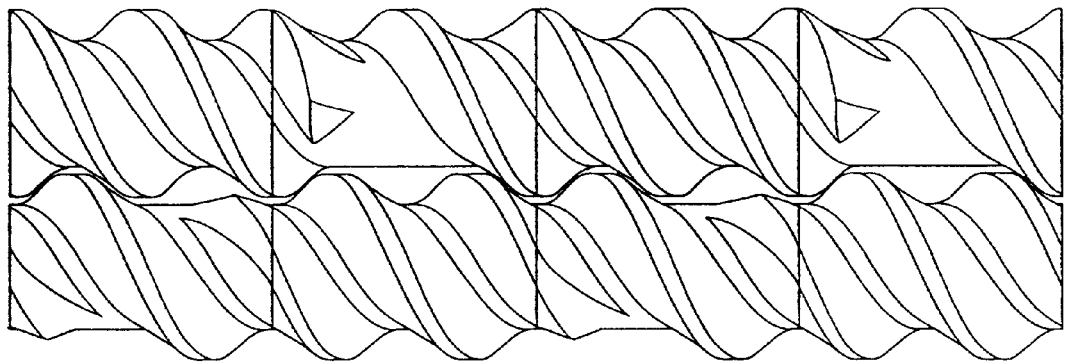
Figure 20:
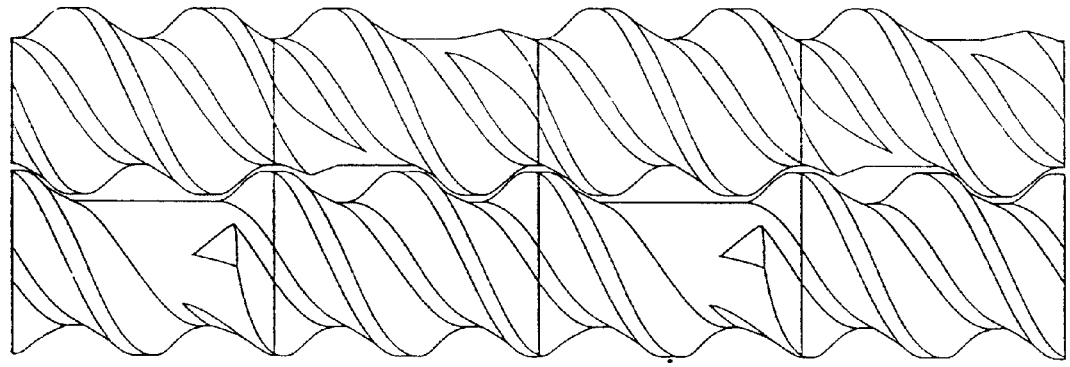

The effect of a flight discontinuity on paired segment(s) of screws may also be seen in FIGS. 17–20. Both screws are rotating out from the plane of the page, and FIGS. 18–20 each represent, successively, a quarter turn from the starting position in FIG. 17. In FIG. 17, a flight discontinuity 40 is facing up on the top screw in two locations, and a flight discontinuity 42 is facing out from the plane of the page in two locations on the bottom screw. In FIG. 18, the discontinuities are facing out on the top and down on the bottom. In FIG. 19, the discontinuities are facing down on the top and into the plane of the page on the bottom. In FIG. 20, the discontinuities are facing into the plane of the page on the top and up on the bottom. It can be seen from these figures that, in the zone of intermeshing, the point of entry for extrudable material to the gap or void between the screws created by a flight discontinuity on a screw is cyclically shifted forward or rearward on the screw axis by the rotation of the screw. This allows for flow stream redirection and the movement of extrudable material from a first channel to one or more other channel(s), and such other channel(s) need not be adjacent to, or on the same screw as, the first channel.

When segments on a particular screw have different numbers of flights, or when one or more segments is non-flighted (i.e. the segment contains no flights), the screw is partially flighted at the location where a flight begins or terminates. At such location, the beginning or termination of a flight may be constructed in the form of a taper. A flight is tapered when its height is gradually increased, starting at its point of origin, out of and away from the surface of the root of the screw, or is gradually reduced until, at its point of terminus, it merges with the surface of the root of the screw. A taper may take the form of a straight line and be shaped as a fin, or it may be shaped as a curved surface. When a flight is tapered into or out of the surface of the root of a screw, the size of the angle at which the flight actually emerges from or merges with the root, whether the taper in its gross dimension has the shape of a fin or a curved surface, may be in the range of from greater than 0° to less than 90°. typical angles of taper have a size in the range of from about 40° to less than 90°. When a flight is tapered into or out of the root of the screw and is, for that reason, not of sufficient height at that location to slidably contact the interior wall of the barrel of the extruder, the discontinuity created by the tapering of that flight will also create, in the zone of intermeshing, a gap or void between the screw containing the discontinuous flight and the paired screw(s). Alternatively, a flight may abruptly begin or terminate at its full height, forming a 90° angle with the root.

Figure 21:
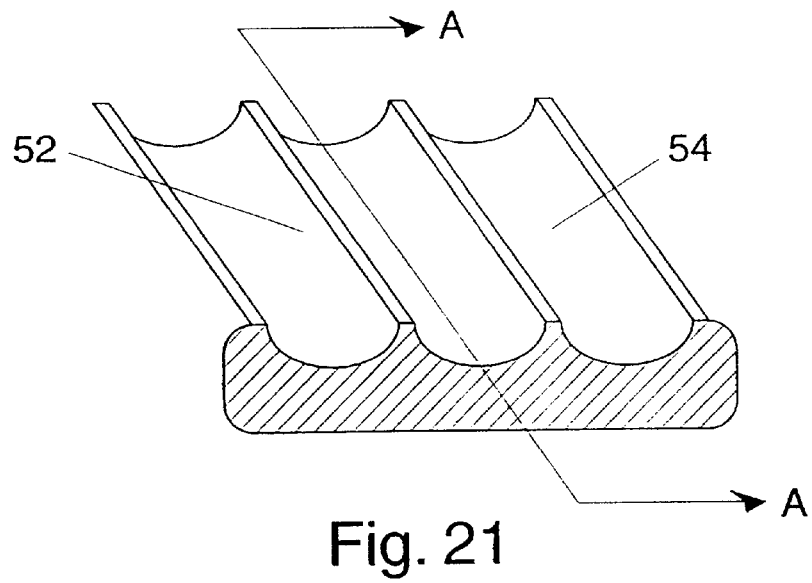
FIG. 21 shows a segment of a 3-flighted screw in which the circumference of the segment has been laid out flat.
Figure 22:
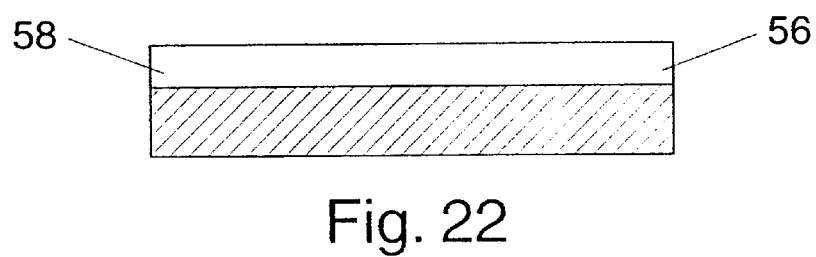
FIGS. 22–24 show the cross section A—A of a flight of the screw shown in FIG. 21.
Figure 23:
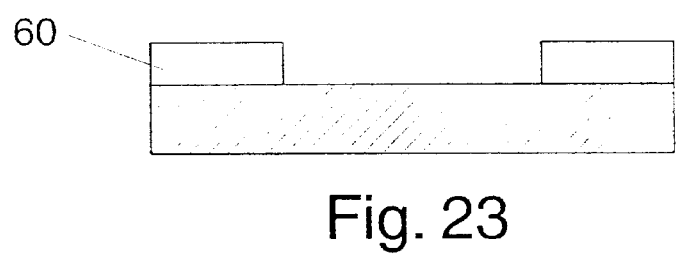
Figure 24:
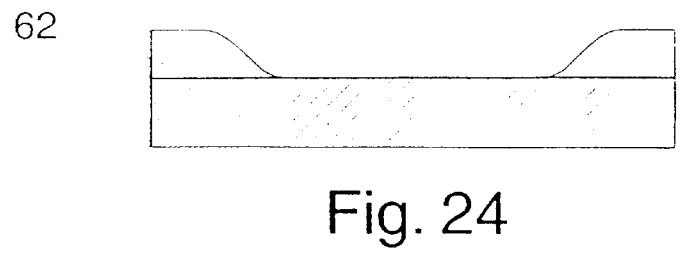
Figure 25:
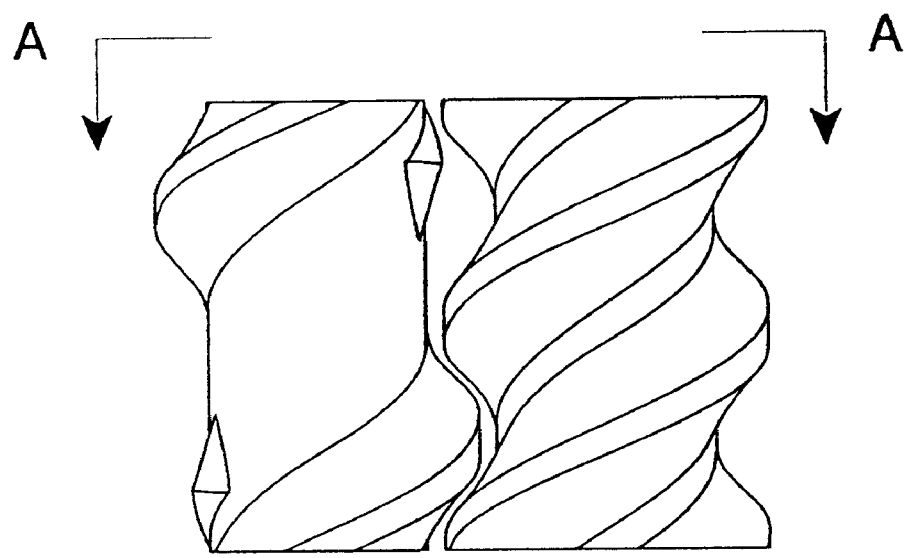
FIG. 25 shows a perspective view of paired screw elements, on one of which a flight terminates and resumes.
Figure 26:
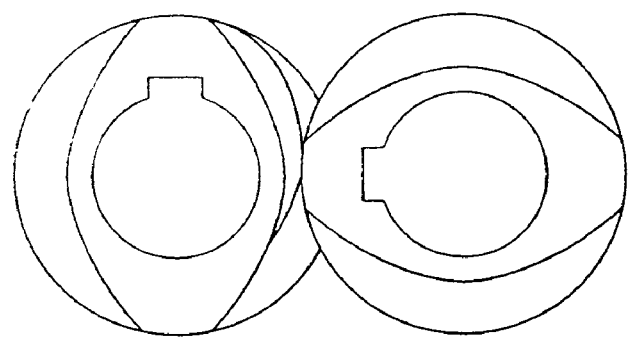
FIG. 26 shows the cross section A—A of the screw in FIG. 25.

For example, in FIG. 21, a segment of a 2-flighted screw is shown with the full circumference of that segment laid out flat. Both flight 52 and channel 54 are shown. In FIGS. 22–24, the cross section A—A of possible designs of a flight in FIG. 21, either full height or discontinuous, is shown. In FIG. 22, the flight 56 is continuous above the root 58. In FIG. 23, the flight 60 terminates and resumes at a 90° angle. In FIG. 24, the flight 62 terminates and resumes in a taper. The beginning or termination of a flight may occur at an end, or at any point between the ends, of a segment of a screw. The termination and resumption of a flight, and the resulting discontinuity in the flight, by tapering the flight into and out of the root of a screw is shown in perspective on the screw element on the left in FIG. 25. In FIG. 26, the discontinuous nature of the flight in question is shown in the A—A cross section from FIG. 25.

Constructing a multiple-screw extruder with screws which have intermeshing segments in which there are unequal numbers of flights produces a surprising improvement in both the mixing and melting capability of the extruder. The gaps or void between paired screws resulting from the absence of at least one flight from one of the screws creates flow field rearrangement and higher degrees of fill in a screw channel that is not bounded by a discontinuous flight. This yields an increased level of mixing and heat transfer between the melted and solid phases of a partially molten system of polymeric material. Benefits of this are lower melt temperatures and increased thermal and compositional homogeneity during processing. The relative pumping efficiency of the screw is increased by having a lower temperature, higher viscosity fluid through which to transfer mechanical energy. The additional pumping efficiency combined with the unique flow patterns and material flow characteristics result in a significant reduction in the tendency for some polymers to vent flow during devolatilization operations.

Figure 1:
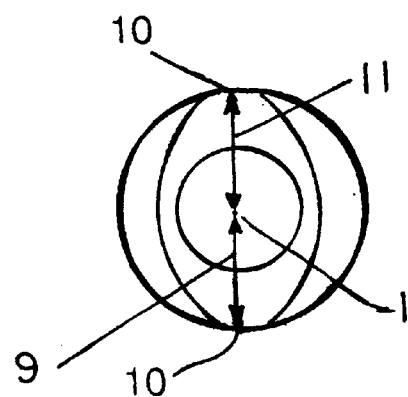
FIG. 1 is a cross-sectional view of a 2-flighted screw.
Figure 2:
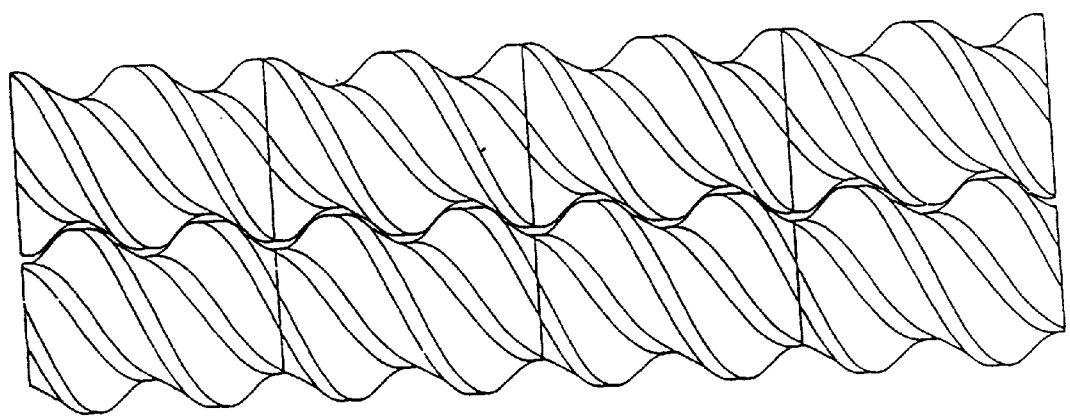
FIG. 2 is a side, plan view of a pair of conventional intermeshing screws.
Figure 2A:
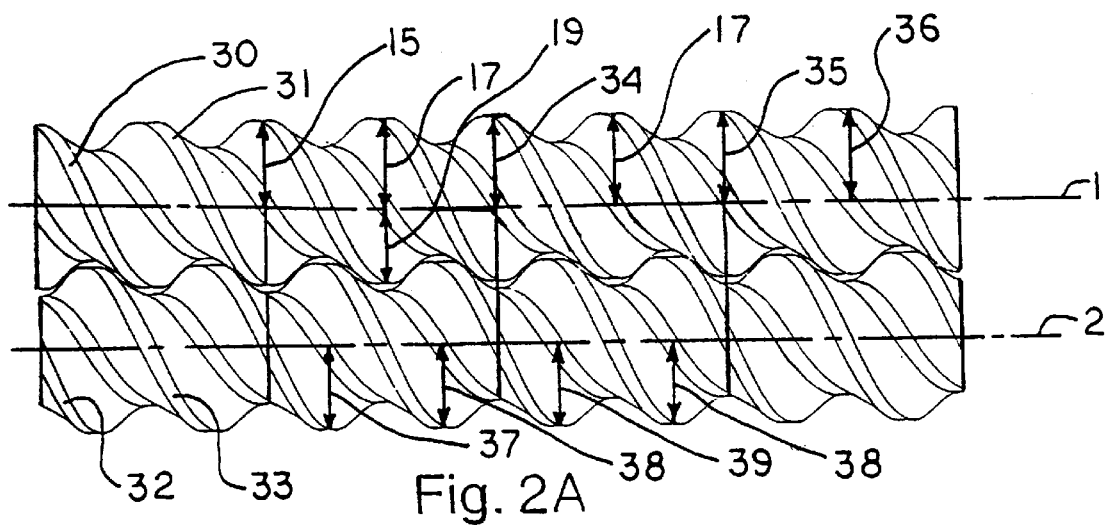
FIG. 2a is a side, plan view of a pair of intermeshing screws of the present invention.

This opportunity to use mixed-lobe-count screws to reduce or eliminate extruder vent flow is particularly beneficial when additives, such as a filler or processing aid, are being compounded with a polymeric resin. For example, when glass is being compounded with polystyrene, it has been found that at least twice as much glass, by weight, can be successfully mixed with polystyrene without experiencing undesirable levels of vent flow when mixed-lobe-count screws are used, as compared to a conventional multiple-screw extruder such as shown in FIG. 2. Use of mixed-lobe-count screws in an extruder of this invention thus provides a method of reducing extruder vent flow to less than about one percent of the extruder through-put rate, preferably to less than about 0.5 percent, more preferably to less than about 0.25 percent, and most preferably results in the substantial elimination of vent flow.

The mixed-lobe embodiment of the invention is exemplified by a trial in which a polymeric blend was made by compounding a mixture of 21 weight percent ploycarbonate flake, 49 weight percent polycarbonate pellet and 30 weight percent acrylonitrile/butadiene/styrene copolymer on a Berstorff 40 mm twin-screw corotating extruder at a rate of 136 kg/hour. One run was made in which all intermeshing segments of the two screws had an equal lobe count. A second run was made in which, over a portion of their length, the screws had an unequal lobe count. In that portion, the first screw had a sequence of segments containing, respectively, 1, 2, 1 and 2 flights, and the second screw had a sequence of segments which intermeshed with the 4 described segments of the first screw but contained, in the same order, 2, 1, 2 and 1 flights, respectively. The results of these two compounding runs are shown in the table below:

|  | Equal Lobe Count | Unequal Lobe Count |
| --- | --- | --- |
| Processing range, rpm | 295–345 | 205–345 |
| Melt temperature, ° C. | 270 | 247 |
| Motor load, amps | 48 | 37 |
| Specific energy, kJ/kg | 460 | 350 |

This data demonstrates that mixed-lobe pairs can be used to improve energy transfer and melting in polymer systems. This leads to lower energy consumption, lower melt temperatures, and a broader, more stable processing window.

Another feature which frequently characterized the design of previously known intermeshing screws is that all flights on such screws, or on paired segments of such screws, either were in contact with the wall of the barrel of the extruder, or wiped another screw in the zone of intermeshing, or had both such characteristics. Within one or more segment(s) of a screw in one of the embodiments of this invention, however, whether the screw is a solid, continuous piece of metal or is assembled as a stack of screw element(s), at least two flights have a different height. Over the course of the flight differential, the flight of lesser height will not be of sufficient height to both contact the wall and wipe another screw in the zone of intermeshing. The height of a flight is measured as the radial distance from the center axis of the screw on which that flight is located to the top of that flight 9 and 11. A difference in flight height is distinguished from a flight discontinuity in the sense that a flight, at the location of discontinuity, has no height, whereas a difference in flight height refers to a situation in which all flights are continuous and thus have a height greater than zero, but do not have equal height.

When flights on a screw or segment thereof differ in height, the top of a first flight, for example, may lie a shorter radial distance away from the center axis of a screw than does the top of a second flight on said screw. Such first flight may have a height which is about 0.99 or less of the height of said second flight, and may in one embodiment have a height which is in the range of about 0.99 to about 0.01, may in another embodiment have a height which is in the range of about 0.95 to about 0.05, may in a further embodiment have a height which is in the range of about 0.90 to about 0.10, and may in yet another embodiment have a height which is in the range of about 0.80 to about 0.20, of the height of the second flight.

The difference in height between two flights on a screw, or segment thereof, need not be constant over the course of the screw or segment. For example, the height of two flights may be compared at the beginning and end of a segment which is one-half turn, or approximately one-half turn, in length. In such a case involving first and second screws which are intermeshed, a first flight 30 on the first screw may have a height of k15 in a first plane which is orthogonal to the center axis 1 of the first screw and in which the top of the first flight is at its location 16 closest to the center axis 2 of the second screw. A second flight on the first screw 31 may have a height of y17 in the first plane, where k is less than y. In a second plane which is orthogonal to the center axis of the first screw but in which the top of the first flight is at its location 18 farthest away from the center axis 2 of the second screw, the first flight has a height of m19 and the second flight has a height of y19, where m is also less than y. m, however, may be about 0.99 or less of the value of k, and may in one embodiment be in the range of about 0.99 to about 0.01, may in another embodiment be in the range of about 0.95 to about 0.05, may in a further embodiment be in the range of about 0.90 to about 0.10, and may in yet another embodiment be in the range of about 0.80 to about 0.20, of the value of k. Alternatively, k may be about 0.99 or less of the value of m, and may in one embodiment be in the range of about 0.99 to about 0.01, may in another embodiment be in the range of about 0.95 to about 0.05, may in a further embodiment be in the range of about 0.90 to about 0.10, and may in yet another embodiment be in the range of about 0.80 to about 0.20, of the value of m.

Where a particular difference in flight height exists in one segment of a screw, other segments of the same screw may be characterized by other conditions. For example, if in a first segment of the screw the height of a first flight 30 is less than the height of a second flight 31, in a second segment (a) the height of the first flight may be less than that of the second by a different amount for example, a second segment within which the top of the first flight lies a radial distance of w 34 away from the center axis of the first screw, the top of the second flight lies a radial distance of y 17 away from the center axis of the first screw, and w is less than or equal to y; and w is less than, equal to or greater than k 15, (b) the first and second flights may be equal in height, or (c) the height of the second flight may be less than the height of the first flight by any amount for example, a second segment within which the top of the first flight lies a radial distance of p 35 away from the center axis of the first screw, the top of the second flight lies a radial distance of q 36 away from the center axis of the first screw, and p is greater than q. There may, moreover, be a plurality of such second segments in which the conditions (a), (b) and (c) may each be found to occur in at least one, and optionally in more than one, segment. When the flight height relationship differs from one segment of a screw to another, the various segments may be located on the screw such that there is a random, ordered or repeating sequence to the location of the different types of segments, any of which may be upstream or downstream from each other. For example, if in a segment A there is a first height difference, and if in a segment B there is no height difference, segments A and B may be adjacent to each other or separated by other intervening segments. Or, if there is a plurality of the segments A and B, they may be arranged in random order, or they may all be adjacent to each other but arranged in an alternating -A-B-A-B-A-B- sequence. If there is a segment C in which there is a second height difference, there again may be a random order, or there may be several varieties of patterned sequences such as -A-B-C-A-B-A-B-C-A-B-A-B-C-. The term "adjacent" as used here means immediately next to along the longitudinal axis of a screw.

Where a particular difference in flight height exists on one screw, or in a segment thereof, another intermeshing screw, or paired segment thereof, may be characterized by other conditions, with effect similar to that set forth above. For example, if in a segment of a first screw the height of one flight is less than that of another, in a paired segment of a second screw which has first 32 and second 33 flights (a) the height of the first flight may be less than that of the second by an amount which is the same as or varies from the height difference on the first screw for example, a segment of the second screw within which the top of the first flight lies a radial distance of s 37 away from the center axis of the second screw, the top of the second flight lies a radial distance of t 38 away from the center axis of the second screw, and s is less than or equal to t or the second segment of the second screw is comprised of first and second flights, and, within said segment, the top of the first flight lies a radial distance of v 39 away from the center axis of the second screw, the top of the second flight lies a radial distance of t away from the center axis of the second screw, and v is less than t, (b) the first and second flights may be equal in height, or (c) the height of the second flight may be less than the height of the first flight by an amount which is the same as or varies from the height difference on the first screw. There may, moreover, be a plurality of such segments on the second screw in which the conditions (a), (b) and (c) may each be found to occur in at least one, and optionally in more than one, segment. When the flight height relationship differs from one segment on the second screw to another, the various segments may be located on the screw such that there is a random, ordered or repeating sequence to the location of the different types of segments. For example, if in a segment A there is a first height difference, and if in a segment B there is no height difference, segments A and B may be adjacent to each other or separated by other intervening segments. Or, if there is a plurality of the segments A and B, they may be arranged in random order, or they may all be adjacent to each other but arranged in an alternating -A-B-A-B-A-B- sequence. If there is a segment C in which there is a second height difference, there again may be a random order, or there may be several varieties of patterned sequences such as -A-B-C-A-B-A-B-C-A-B-A-B-C-. Moreover, for every type of segment as described above on the second screw, there may be a paired segment on the first screw which is characterized by a flight height relationship which is the same as or differs from that on the segment in question of the second screw.

Constructing a multiple-screw extruder with at least one screw which contains a flight height differential produces the same kind of improvement in both the mixing and melting capability of the extruder as described above with respect to the mixed lobe-count embodiment. For example, a preferred corotating multiple-screw extruder comprises a first and a second screw which are intermeshed, wherein (a) the first screw comprises first and second flights;

(b) the first screw comprised a first segment, within the first segment on the first screw both flights are continuous and the top of the first flight lies a radial distance of k away from the center axis of the first screw, the top of the second flight lies a radial distance of y away from the center axis of the first screw, and k is less than y;

(c) the second screw comprises first and second flights;

(d) the second screw comprises a first segment, within the first segment of the second screw both flights are continuous and the top of the first flight lies a radial distance of s away from the center axis of the second screw, the top of the second flight lies a radial distance of t away from the center axis of the second screw, and s is equal to t;

(e) the first segment of the first screw is paired with the first segment of the second screw;

(f) the first screw further comprises a second segment within which both flights are continuous and the top of the first flight lies a radial distance of w away from the center axis of the first screw, the top of the second flight lies a radial distance of y away from the center axis of the first screw, and w is equal to y;

(g) the second screw further comprises a second segment within which both flights are continuous and the top of the first flight lies a radial distance of v away from the center axis of the second screw, the top of the second flight lies a radial distance of t away from the center axis of the second screw, and v is less than t; and (h) the second segment of the first screw is paired with the second segment of the second screw.

Virtually any extrudable material which will flow may be mixed or conveyed in the multiple-screw extruder of this invention. For example, various polymeric materials may be plasticated by melting or heat softening for mixing or conveying, or may be subjected to other operations in the multiple-screw extruder of this invention such as reaction or devolatilization. The presence of reactive species in the extrudable material may result in reactions such as polymerization, graft polymerization, branching or chain scission. The following are exemplary of polymers and copolymers, or alloys or blends of two or more thereof, which are suitable for such plastication, but this listing is not intended to be exhaustive or to limit the scope of this invention:

polyacetal, including that which is formed by the bond opening and polymerization of the carbonyl group of an aldehyde to give a —(—$CH_2$—O—)— repeating unit, as well as the reaction products of polyols and aldehydes;

polyacrylamide;

polyacrylate;

polyacrylonitrile;

polyamide;

polyarylate poly(arylene sulfide), including that which is prepared by the reaction of p-dichlorobenzene with $Na_2S$ in a polar organic solvent to give a —(—$_p$Ar—S—)— repeating unit;

azo polymers, including those which are prepared by the polymerization of an azobutyronitrile with a diamine or diol to give a —(—R—N=N—R—)— repeating unit or those prepared by polymerization of monomers containing an azo side group in addition to a polymerizable functionality to give a —[—R(N=N—R')—]— repeating unit;

polybenzimidazole, including that which is prepared by condensation of aromatic tetraamino compounds with dicarboxylic acids;

polycarbonate, including copolymers thereof;

poly(cyclo hexane);

polyester, including copolymers thereof;

poly(ethylene oxide);

polyimidazole, including that which is prepared by polymerization of vinylimidazole monomer;

polyimide, including that which is prepared by condensation of bifunctional carboxylic acid anhydrides with a diamine to give a —[—C(O)—N—R—C(O)—]— repeating unit;

poly(lactic acid);

poly(methyl methacrylate)

polyolefin, including copolymers thereof;

poly(phenylene ether), including that which is prepared by the oxidative coupling polymerization of a phenol to give a —(—$_p$Ar—O—)— repeating unit;

polyphosphazine, including that which is prepared by the polymerization of the cyclic trimer produced by the reaction of phosphorous pentachloride and ammonium chloride to give a —[—N=P($R_2$)—]— repeating unit;

poly(propylene oxide);

polyquinoxaline, including that which is prepared by the solution polymerization of aromatic bis($_o$diamine) and bis(glyoxal hydrate);

polysilane;

polysiloxane;

polystyrene (for example, syndiotactic polystyrene), including copolymers thereof;

polysulfone;

polyurea;

polyurethane; and vinyl polymers, including poly(vinyl acetate), poly(vinyl alcohol), poly(vinyl amide), poly(vinyl chloride), and poly(vinyl ether), and including copolymers of each; where, in any of the above formulae, R and R' are organic (e.g. $C_1$-$C_{20}$) radicals, and Ar is an aromatic organic (e.g. $C_6$-$C_{10}$) radical.

This invention is also applicable to copolymers formed from two or more monomers or co-monomers, such copolymers including but not being limited to:

acrylonitrile/butadiene/styrene copolymer, acrylonitrile/EPDM/styrene copolymer where EPDM is ethylene/propylene/diene rubber, acrylonitrile/styrene/alkyl acrylate copolymer, poly(ester/carbonate) copolymer, ethylene/carbon monoxide copolymer, ethylene/styrene interpolymer, ethylene/vinyl acetate copolymer, methyl methacrylate/butadiene/styrene/acrylonitrile copolymer, phenyl maleimide/acrylonitrile/butadiene/styrene copolymer, styrene/acrylonitrile copolymer, and styrene/maleic anhydride copolymer.

This invention is also applicable to blends and alloys of two or more polymers and/or copolymers, including blends or alloys which may be formed from polymers or copolymers such as those named above. Specific examples of useful blends or alloys are:

acrylonitrile/butadiene/styrene copolymer blended with polycarbonate, polyamide, polyester, or polyurethane;

polyacetal blended with polyurethane;

polycarbonate blended with polyamide, polyester, or styrene/acrylonitrile copolymer; and polyphenylene ether blended with (i) polyamide and a vinyl aromatic/conjugated diene di- or tri-block copolymer; (ii) polyester; or (iii) polystyrene to which can be grafted a vinyl aromatic/conjugated diene di- or tri-block copolymer.

What is claimed is:

1. A corotating multiple-screw extruder comprising first and second screws which are intermeshed, wherein
   (a) the first screw is comprised of first and second flights;
   (b) within a first segment of the first screw which has a longitudinal distance of at least one-half of a turn, both flights are continuous and the top of the first flight lies a radial distance of k away from the center axis of the first screw, the top of the second flight lies a radial distance of y away from the center axis of the first screw, and k is less than y;
   (c) the first screw further comprises a second segment within which both flights are continuous and the top of the first flight lies a radial distance of w away from the center axis of the first screw, the top of the second flight lies a radial distance of y away from the center axis of the first screw, and w is less than or equal to y;
   (d) the first segment of the first screw is paired with a first segment of the second screw;
   (e) the first segment of the second screw is comprised of first and second continuous flights, and, within said segment, the top of the first flight lies a radial distance of s away from the center axis of the second screw, the top of the second flight lies a radial distance of t away from the center axis of the second screw, and s is equal to t;
   (f) the second segment of the first screw is paired with a second segment of the second screw; and
   (g) the second segment of the second screw is comprised of first and second continuous flights, and, within said segment, the top of the first flight lies a radial distance of v away from the center axis of the second screw, the top of the second flight lies a radial distance of t away from the center axis of the second screw, and v is less than t.

2. An extruder in accordance with claim 1 wherein k is less than or equal to about 0.99(y).

3. An extruder in accordance with claim 1 wherein the difference between k and y is not constant over the course of said segment of the first screw.

4. An extruder in accordance with claim 1 wherein the first segment of the first screw has a longitudinal distance in the range of one-half turn to about one turn.

5. An extruder in accordance with claim 1 wherein
   (a) the top of the first flight, when measured in a first plane orthogonal to the center axis of the first screw in which the top of the first flight is at its location closest to the center axis of the second screw, lies a radial distance of k away from the center axis of the first screw;
   (b) the top of the second flight when measured in said first plane lies a radial distance of y away from the center axis of the first screw;
   (c) the top of the first flight, when measured in a second plane orthogonal to the center axis of the first screw in which the top of the first flight is at its location farthest away from the center axis of the second screw, lies a radial distance of m away from the center axis of the first screw;
   (d) the top of the second flight when measured in said second plane lies a radial distance of y away from the center axis of the first screw; and
   (e) k is less than y, m is less than y, and k is less than or equal to about 0.99(m).

6. An extruder in accordance with claim 1 wherein
   (a) the top of the first flight, when measured in a first plane orthogonal to the center axis of the first screw in which the top of the first flight is at its location closest to the center axis of the second screw, lies a radial distance of k away from the center axis of the first screw;
   (b) the top of the second flight when measured in said first plane lies a radial distance of y away from the center axis of the first screw;
   (c) the top of the first flight, when measured in a second plane orthogonal to the center axis of the first screw in which the top of the first flight is at its location farthest away from the center axis of the second screw, lies a radial distance of m away from the center axis of the first screw;
   (d) the top of the second flight when measured in said second plane lies a radial distance of y away from the center axis of the first screw; and
   (e) k is less than y, m is less than y, and m is less than or equal to about 0.99(k).

7. An extruder in accordance with claim 1 wherein w is less than y and the difference between w and y is not constant over the course of the second segment.

8. An extruder in accordance with claim 1 wherein w is less than y, and the difference between k and y is not equal to the difference between w and y.

9. An extruder in accordance with claim 1 wherein w is equal to y.

10. An extruder in accordance with claim 1 wherein the second segment of the first screw has a longitudinal distance in the range of about one-quarter turn to about ten turns.

11. An extruder in accordance with claim 1 wherein the first and second segments of the first screw are adjacent to each other.

12. An extruder in accordance with claim 1 wherein the first screw comprises a plurality of first and second segments.

13. An extruder in accordance with claim 1 wherein a plurality of first and second segments are adjacent to each other in an alternating sequence.

14. An extruder in accordance with claim 1 wherein t equals y.

15. An extruder in accordance with claim 1 wherein w is equal to y, and t is equal to y.

16. An extruder in accordance with claim 15 wherein the first screw comprises a plurality of first and second segments.

17. An extruder in accordance with claim 15 wherein a plurality of first and second segments are adjacent to each other in an alternating sequence.

18. A corotating multiple-screw extruder comprising first and second screws which are intermeshed, wherein
   (a) the first screw is comprised of first and second flights;
   (b) within a first segment of the first screw which has a longitudinal distance of at least one-half of a turn, both flights are continuous and the top of the first flight lies a radial distance of k away from the center axis of the first screw, the top of the second flight lies a radial distance of y away from the center axis of the first screw, and k is less than y;

(c) the first screw further comprises a second segment within which both flights are continuous and the top of the first flight lies a radial distance of p away from the center axis of the first screw, the top of the second flight lies a radial distance of q away from the center axis of the first screw, and p is greater than q;

(d) the first segment of the first screw is paired with a first segment of the second screw;

(e) the first segment of the second screw is comprised of first and second continuous flights, and, within said segment, the top of the first flight lies a radial distance of s away from the center axis of the second screw, the top of the second flight lies a radial distance of t away from the center axis of the second screw, and s is equal to t;

(f) the second segment of the first screw is paired with a second segment of the second screw; and (g) the second segment of the second screw is comprised of first and second continuous flights, and, within said segment, the top of the first flight lies a radial distance of v away from the center axis of the second screw, the top of the second flight lies a radial distance of t away from the center axis of the second screw, and v is less than t.

19. An extruder in accordance with claim 18 wherein the difference between p and q is not constant over the course of the second segment.

20. An extruder in accordance with 18 wherein the difference between p and q is not equal to the difference between k and y.

21. An extruder in accordance with claim 18 wherein the second segment has a longitudinal distance in the range of about one-quarter turn to about ten turns.

22. An extruder in accordance with claim 18 wherein the first and second segments are adjacent to each other.

23. An extruder in accordance with claim 18 which comprises a plurality of first or second segments.

24. An extruder in accordance with claim 18 wherein a pluraltiy of first and second segments are adjacent to each other in an alternating sequence.

25. An extruder in accordance with claim 18 wherein the first and second segments of the first screw are adjacent to each other.

* * * * *

UNITED STATES PATENT AND TRADEMARK OFFICE
CERTIFICATE OF CORRECTION

PATENT NO. : 6,062,719
DATED : May 16, 2000
INVENTOR(S) : Forest Busby et al.

It is certified that error appears in the above-identified patent and that said Letters Patent is hereby corrected as shown below:

Title page,

Column 1,
Inventors, delete "Kathryn S. Jones, Clarksville, N.Y." and insert -- Kun Hyun, Midland, MI --.

Column 16, claim 15,
Line 53, "following the first occurrence of y" delete -- , --.

Column 18, claim 25,
Line 20, delete "18" and insert -- 1 --.

Signed and Sealed this

Twenty-eighth Day of August, 2001

Attest:

NICHOLAS P. GODICI
Attesting Officer
*Acting Director of the United States Patent and Trademark Office*

UNITED STATES PATENT AND TRADEMARK OFFICE
CERTIFICATE OF CORRECTION

PATENT NO. : 6,062,719
DATED : May 16, 2000
INVENTOR(S) : Forest Busby et al.

It is certified that error appears in the above-identified patent and that said Letters Patent is hereby corrected as shown below:

<u>Title page,</u>
Item [75], Inventors, delete "Kathryn S. Jones, Clarksville, N.Y." and insert -- Kun Hyun, Midland, MI --.

<u>Column 16,</u>
Line 53, following the first occurrence of "y" delete ",".

Signed and Sealed this

Thirty-first Day of December, 2002

JAMES E. ROGAN
*Director of the United States Patent and Trademark Office*